United States Patent [19]
Watzold et al.

[11] Patent Number: 5,454,621
[45] Date of Patent: Oct. 3, 1995

[54] PASSENGER CAR WITH SIDE DOOR SILLS

[75] Inventors: Peter Watzold, Wettstetten; Anton Zavojan, Offenau; Gunter Konrad, Bad Rappenau; Werner Holl, Neuenstadt, all of Germany

[73] Assignee: Audi AG, Ingolstadt, Germany

[21] Appl. No.: 78,263

[22] PCT Filed: Jan. 23, 1992

[86] PCT No.: PCT/EP92/00138
§ 371 Date: Jun. 28, 1993
§ 102(e) Date: Jun. 28, 1993

[87] PCT Pub. No.: WO92/12890
PCT Pub. Date: Aug. 6, 1992

[30] Foreign Application Priority Data

Jan. 26, 1991 [DE] Germany .......... 41 02 353.6

[51] Int. Cl.⁶ .................................. B62D 25/20
[52] U.S. Cl. ............................. 296/204; 296/209
[58] Field of Search ............... 296/63, 65.1, 204, 296/209

[56] References Cited

U.S. PATENT DOCUMENTS

| | | | |
|---|---|---|---|
| 1,723,518 | 8/1929 | Murray | 280/796 |
| 2,809,050 | 10/1957 | Bauer | 280/795 |
| 3,617,087 | 11/1971 | Hiramatsu | 296/63 X |
| 3,897,974 | 8/1975 | Barecki | 296/63 X |
| 4,203,611 | 5/1980 | Makela | 280/163 |
| 4,552,400 | 11/1985 | Harasaki et al. | 296/209 X |

FOREIGN PATENT DOCUMENTS

| | | | |
|---|---|---|---|
| 0043228 | 1/1982 | European Pat. Off. . | |
| 0229591 | 7/1987 | European Pat. Off. . | |
| 2637853 | 4/1990 | France . | |
| 2916562 | 10/1980 | Germany . | |
| 2923874 | 1/1981 | Germany | 296/209 |
| 3115699 | 10/1982 | Germany . | |
| 3722490 | 2/1989 | Germany . | |
| 3807386 | 9/1989 | Germany . | |
| 3-38474 | 2/1991 | Japan | 296/65.1 |

*Primary Examiner*—Andrew C. Pike
*Attorney, Agent, or Firm*—Jacques M. Dulin; Frederick J. Zustak

[57] ABSTRACT

The invention concerns a passenger car with longitudinally adjustable front seats which slide back and forth along inner and outer seat rails made of steel and with side door sills made of light-alloy extruded sections to which front and rear mounting brackets for the outer seat rails are welded. In order to obtain an additional, interlocking joint, the mounting brackets are designed with an upwardly extended lip which is receivingly engaged within a downwardly facing groove provided in a hook-like extension of the door sill extrusion.

3 Claims, 1 Drawing Sheet

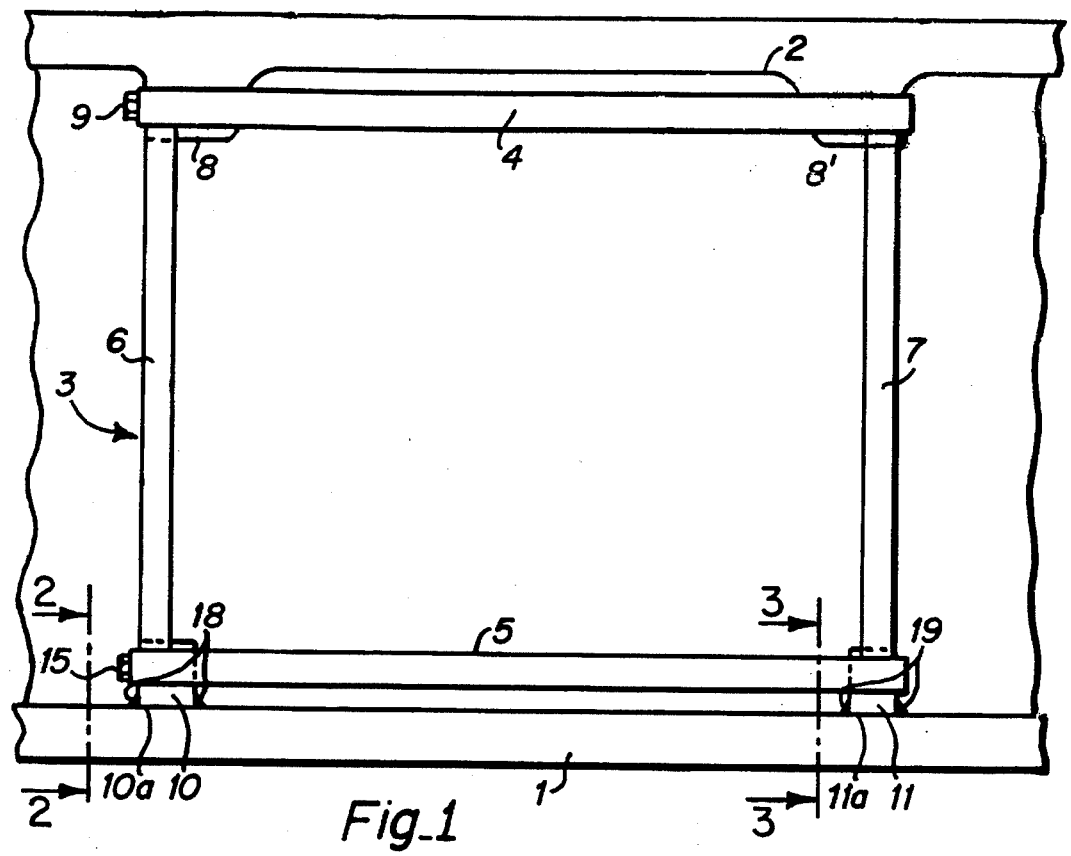
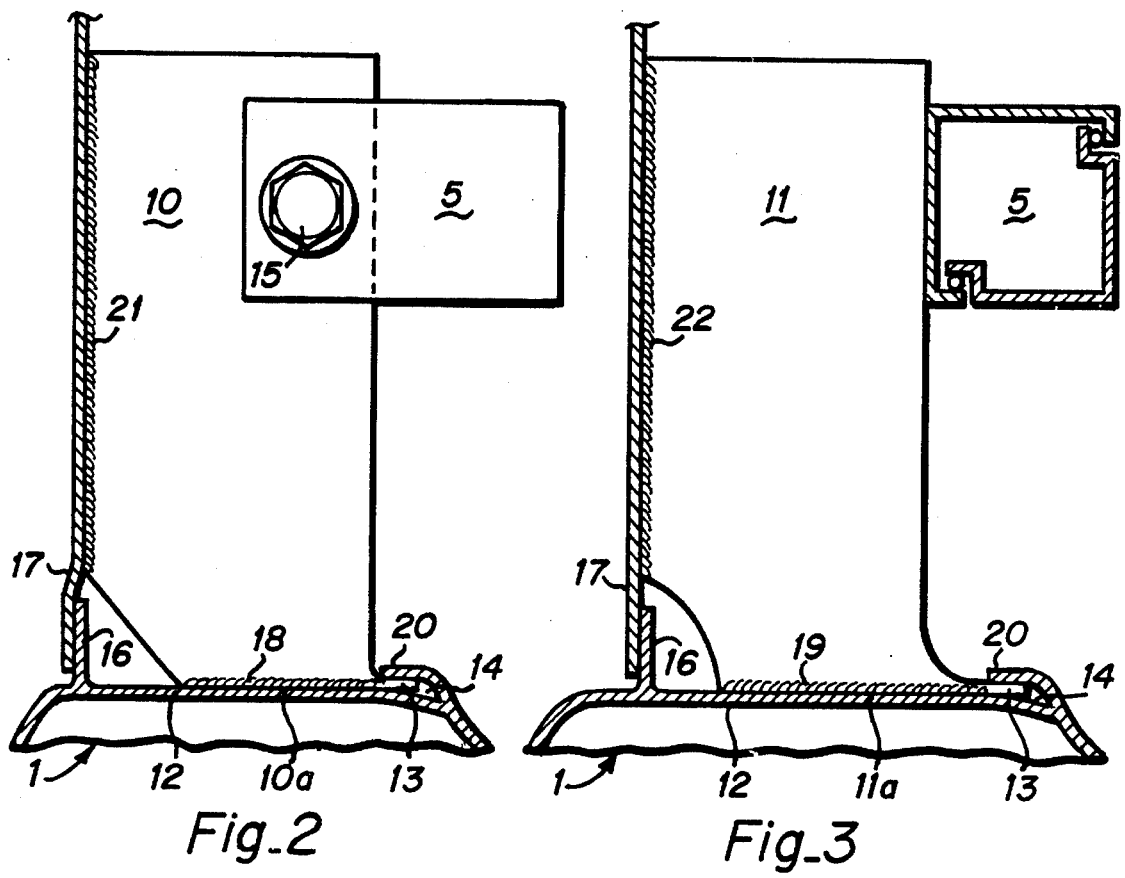

5,454,621

PASSENGER CAR WITH SIDE DOOR SILLS

FIELD

The present invention relates to a passenger vehicle having side door sills and having front seats, each of which are longitudinally adjustable with respect to a pair of seat rails mounted to the floorboard region of the passenger vehicle.

BACKGROUND

In the typical passenger vehicle, the support for the front passenger seats consists of a pair of steel seat rails which are mounted to the floorboard region of the vehicle body and include an inner seat rail disposed adjacent the longitudinal center axis of the vehicle and an outer seat rail welded to a corresponding side door sill member. However, such a weld connection for the outer seat rail is only possible where the materials selected for the door sill member and the outer seat rail are capable of being welded to one another.

A current trend in motor vehicle design has been to reduce the overall weight of the vehicle by using extruded light-alloy sections in place of traditional welded together sheet metal stampings for various hollow section, load bearing members of the vehicle bodywork. For example, European Patent Document No. 0 229 591 discloses side door sill members which are fabricated from light-alloy extruded sections. In such a design, however, it is not possible to weld the seat rail to the alloy door sill member since the seat rail must consist of steel in order to satisfy the requirements of material thickness, strength, and stiffness and thus cannot be welded to a dissimilar material such as light-alloy. Another disadvantage of the above-described design is that it is difficult to combine the two steel seat rails into an alloy underframe in order to simplify assembly.

German Patent Document DE-C 2 916 562 discloses a similar construction wherein an underframe for the front passenger seat is fastened at its front and rear to adjacent front and rear cross members which are formed integral with the floor panel. This design, however, is disadvantageous since the leg room for the front passengers is restricted by the introduction of the forward cross member disposed in front of the underframe. Also, the relatively thin floor panel cannot withstand the forces acting on the seat rails in the event of a front or rear collision but rather tears unless special reinforcements are provided.

Accordingly, there is a definite need in the art for an improved connection between a steel outer seat rail and a adjacently disposed extruded light metal side door sill member which overcomes the problems of the prior art.

THE INVENTION

OBJECTS

It is a primary object of the present invention to provide a secure retention for the forward steel seat rails of a passenger seat to the floorboard region of a light-weight passenger vehicle of the generic type wherein the load bearing members of the bodywork superstructure including the side door sill members are formed as light-alloy extruded sections.

It is another object of the present invention to provide a secure retention of the steel seat rails on the floorboard region of a light-weight passenger vehicle of the generic type which eliminates the need for special reinforcements to ensure that the seat rails are prevented from tearing from the vehicle floor panel in the event of a front or rear impact.

These and further objects, features, and advantages will be evident from the following written description, drawings, and appended claims.

SUMMARY

According to the invention, a side door sill member is provided which comprises a light-alloy extruded section to which forward and rearward supporting mounts, also made of light-alloy, are provided for joining an outer steel seat rail to the side door sill member. Each supporting mount includes an upwardly extended tongue or lip member at an outer side edge thereof which, in use, receivingly engages a corresponding downwardly oriented open groove provided in a hook member extension of the side door sill member. The hook member extension is preferably formed integral with the side door member during the extrusion process. Each support member includes a bottom surface welded to the vehicle floor panel and an outward facing side surface welded to the inward facing side surface of the door sill member.

In accordance with conventional seat support assembly technique, the outer seat rail includes a hook member at its rear end for connection to the rearwardly disposed supporting mount. At its forward end the outer seat rail includes a downward extension which overlaps a forward facing surface of the front seat mount and is attached thereto by a bolt connection. The combination of the weld connection between the seat supports to both the floor panel and the side door sill member with the additional positive reinforcement between the supporting mounts and the door sill member afforded by the above described "tongue-in-groove" type connection guarantee that the outer seat rail will not separate from the side door sill at its rear connection point in the event of a front impact or that the outer seat rail will not separate from the side door sill at its front connection point in the event of a rear impact which would otherwise occur if the supporting mounts were merely welded in place.

A further advantage of the invention is that, unlike the reinforcement schemes of the prior art, the proposed longitudinal tongue and groove connection does not give rise to any increase in cost since the downward hook member and longitudinal groove are easily formed integral with the side door sill member in the extrusion process.

DRAWINGS

An exemplary embodiment of the invention is described below with reference to the drawings, in which:

FIG. 1 is a partial top plan view of the interior of a passenger vehicle showing the floor region between the central, longitudinally oriented vehicle tunnel and a side door sill member;

FIG. 2 is a cross-sectional view taken along the line and in the direction of arrows 2—2 of FIG. 1;

FIG. 3 is a cross-sectional view taken along the line and in the direction of arrows 3—3 of FIG. 1.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives, and uses of the invention, including what we presently believe is the best mode of carrying out the invention.

FIG. 1 shows a plan view of the area of a front seat of a passenger vehicle with only the underframe 3 of the front seat shown for clarity. This area is delimited by an extruded light-alloy side door sill member 1 and a central longitudinally oriented vehicle tunnel 2. The underframe 3 comprises two longitudinal rails 4 and 5 which are connected at opposite ends by cross members 6 and 7. The actual seat, which is not shown, is mounted in longitudinally displacable fashion on the underframe 3. The cross members 6 and 7 serve merely to facilitate assembly and are not functionally necessary since the seat is guided displacably on the seat rails 4 and 5.

The inner seat rail 4, that is to say the upper seat rail shown in FIG. 1, rests with its ends on brackets 8, 8' formed integral with the vehicle tunnel 2 and is connected in positive engagement to the forward bracket 8 by a bolt 9 and to the rearward bracket 8' by a hook (not shown) in accordance with the connection technique disclosed in the above-mentioned DE-C 2 916 562. The outer seat rail 5, that is to say the lower seat rail shown in FIG. 1, cannot be fastened in this way since the door sill 1 consists of a light-alloy extruded section and therefore has the same cross section over its entire length. For this reason, forward and rearward supporting mounts 10 and 11, each comprising a similar light-alloy material, are connected along their respective outward facing walls 10a, 11a to the inner wall 12 of the door sill 1 by weld seams 18a and 19, respectively, to allow the fastening of the seat rail 5 as shown in FIG. 2. An additional positive connection between the supporting mounts 10, 11 and the door sill 1 is achieved by the fact that the supporting mounts each have an upward-projecting lip member 13 which is receivingly engaged within a downwardly open longitudinal groove 14 disposed in a hook extension 20 of the extruded section of the door sill 1, also shown in FIG. 2, and in FIG. 3. At its forward end, the seat rail 5 is connected to the forward supporting mount 10 by a bolt 15 and, like the inner seat rail 4, is connected at its rearward end by a hook to the rearward supporting mount 11 (not shown).

The engagement of the lip member 13 of the supporting mounts 10, 11 within the longitudinal groove 14 provides a firm "tongue-in-groove" connection which ensures that the seat rail 5 does not cause the front or rear mounts to come loose from the door sill 1 in the event of a front or rear impact, even in the event where the weld seams connecting the supporting mounts to the inner wall 12 of the door sill (i.e., either weld seam 18 and 19) were to break.

As shown in FIGS. 2 and 3, the extruded section door sill member 1 includes a bottom extension 16 which is connected to a floor panel 17 by a weld seam (not shown for clarity). The bottom surface of the supporting mounts 10, 11 are likewise connected to the floor panel 17 by weld seams 21 and 22, respectively.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. An improved passenger vehicle of the type having a light-alloy extruded section side door sill member and front seats adapted for longitudinal adjustment along a pair of steel seat rails disposed along a floor panel of said passenger vehicle including an inner seat rail disposed connected to a central, longitudinally oriented vehicle tunnel member and an outer seat rail disposed adjacent said extruded section side door sill member, wherein the improvement comprises in operative combination:

a) a front mount extending transversely inwardly from said side door sill member a length sufficient to support thereon a forward end of the outer seat rail above the floor panel, said front mount being weld-connected to the extruded section side door sill member;

b) a rear mount extending transversely inwardly from said side door sill member a length sufficient to support thereon a rear end of the outer seat rail above the floor panel, said rear mount being weld-connected to the extruded section side door sill member; and c) means for connecting each of said front mount and said rear mount to said floor panel; wherein:

d) each of said front and rear mounts includes an upwardly extended lip member disposed along an upper surface thereof; and e) the extruded section side door sill member is integrally provided with a downwardly oriented hook member which includes a longitudinal groove sized to receivingly engage both of said upwardly extended lip members of each of said mounts to provide a positive engagement between said mounts and said extruded side door sill member.

2. An improved passenger vehicle as in claim 1 wherein:

a) the extruded section side door sill member includes a laterally inward extension member disposed adjacent a bottom region thereof; and b) said extension member is welded to said floor panel.

3. An improved passenger vehicle as in claim 2 wherein:

a) said means for connecting said front and rear mounts to said floor panel comprises weld connections.

* * * * *